Feb. 9, 1943.    C. HAUSBECK    2,310,287
COMBINED HOLDER FOR SCREW AND SCREW DRIVERS
Filed Dec. 5, 1940
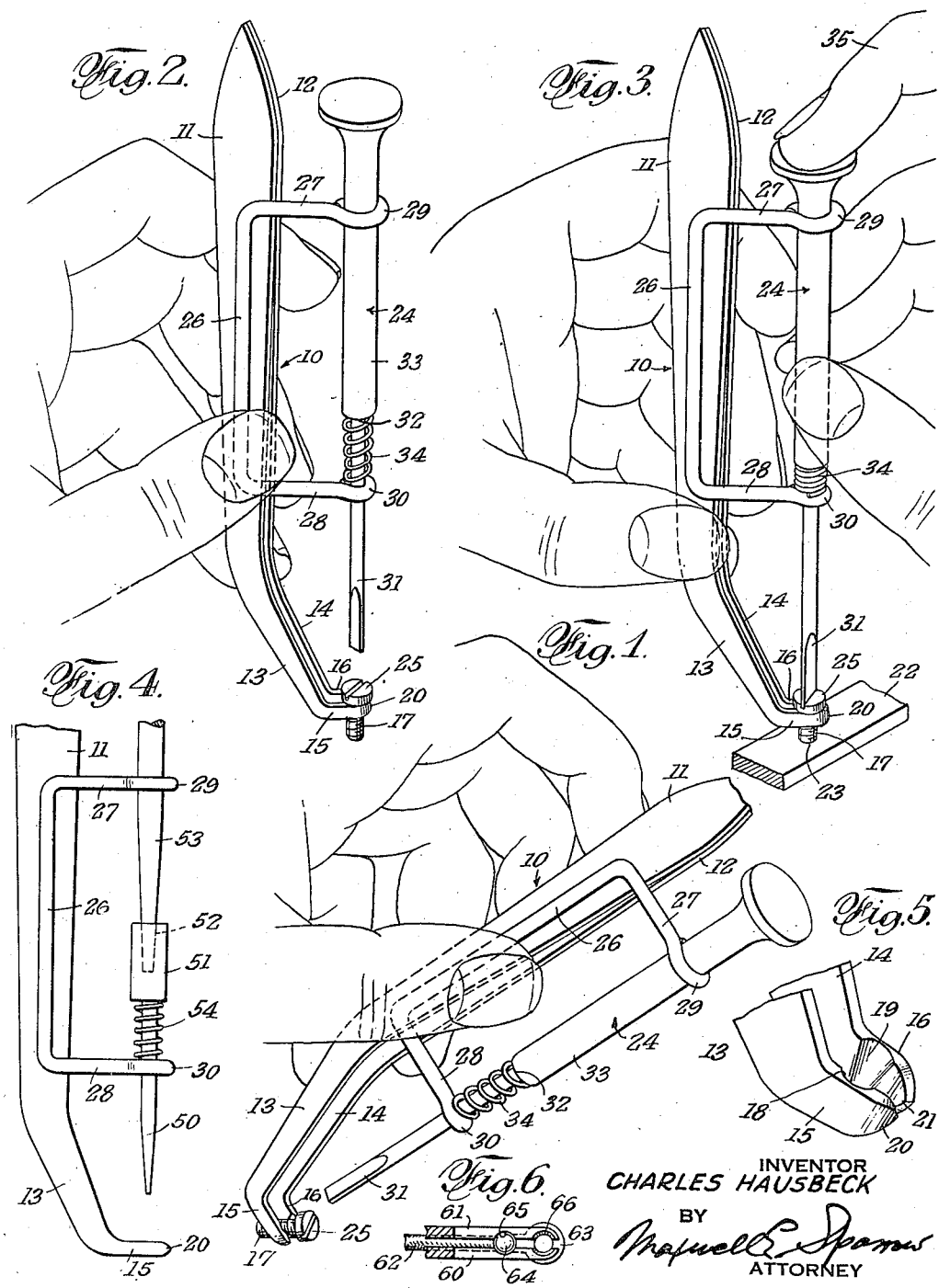
INVENTOR
CHARLES HAUSBECK
BY
ATTORNEY Patented Feb. 9, 1943

2,310,287

UNITED STATES PATENT OFFICE 2,310,287

COMBINED HOLDER FOR SCREWS AND SCREW DRIVERS

Charles Hausbeck, New York, N. Y.

Application December 5, 1940, Serial No. 368,556

1 Claim. (Cl. 145—52)

This invention is a combined holder for screw and screw driver.

It is an object of the present invention to provide a device for picking up a relatively small screw, holding a screw driver, adjusting the screw in alinement with the blade of the screw driver and gripping the screw in adjusted position, whereby the screw may be alined with the threaded hole receiving the same and worked upon by the screw driver.

It is a further object of the present invention to provide a holder of the aforesaid type by which the screw may be picked up, positioned and gripped independently of the movement of the screw driver.

A still further object of the present invention resides in the provisions of a screw-gripper which is constructed in such a manner as to efficiently guide the screw upon its being picked up by the gripper to working position between the jaws of the gripper.

Yet another object of the present invention is to provide a solely manually manipulatable gripper for a relatively small screw incorporating a guide for freely and rotatably maintaining a screw driver in spaced relation therewith and in working relation with the screw clamping part of the gripper in order that the bit of the screw driver may engage the slot or kerf in the screw head to drive the latter.

Another object of the present invention is to provide resilient means to permit automatic disengagement of the screw driver from the screw slot after the screw has been driven.

Still another object of the present invention resides in the provision of a screw gripper of the above-mentioned style in which the jaws are operable independently of action or movement of the screw driver.

A further object of the present invention is to provide a combined screw driver holder and screw holder which positions and clamps the screw prior to its insertion in the threaded hole and guides the said screw during the threading action.

Further objects and advantages of the invention will appear from the following disclosure thereof together with the attached drawing which illustrates certain forms of embodiment thereof. These forms are shown for the purpose of illustrating the invention since the same have been found in practice to give satisfactory and reliable results, although it is to be understood that the invention is not limited to the precise arrangement herein shown and described.

Fig. 1 is a perspective view of a combined holder for screw and screw driver made in accordance with the invention illustrating the device in the act of picking up the screw;

Fig. 2 illustrates the said device holding the screw in adjusted position ready to be driven by the screw driver guidedly held by the device;

Fig. 3 illustrates the device gripping the screw while it is being driven by the screw driver guided by the device;

Fig. 4 is a partly broken away view of the device guidingly holding a screw driver in a modified form, and Fig. 5 is a fragmentary detail view of the gripping end of the device;

Fig. 6 is a plan sectional detail view of an alternate form of device for handling objects other than screws.

Referring now more particularly to the drawing, there is disclosed pincers or tweezers 10 which may comprise the members 11, 12 welded or otherwise formed together at their upper ends. The members 11, 12 are springy and are normally spaced apart below the welded portions. The members 11, 12 of tweezers 10 are bent or shaped similarly angularly at their lower ends providing spaced legs 13, 14.

These legs are preferably each provided with a lateral arcuate tapered surface such as shown at 18 and 19 of Fig. 5 to form a seat for the shank 17 of the screw and to permit its head 25 to be directed towards the plate 22 (Fig. 3) when said screw is being sunk as into the tap 23. It is obvious that as the screw head 25 approaches the plate 22, it wedges the legs 15 and 16 apart being guided by the mentioned surfaces 18 and 19. In order to more surely pick up the screw and to position the same between the surfaces 18 and 19, the mentioned legs are inturned towards each other as at 20 and 21, said inturned portions being preferably tapered.

To aline the screw driver 24 with relation to the jaws or grippers 15, 16 and the screw head 25, there is provided a holder 26 having a pair of arms 27, 28 provided with loops 29, 30 through which the screw driver 24 is guidedly and rotatably received, the shank or blade 31 of the driver 24 extending below the arm 28. Interposed between shoulder 32 of driver handle 33 is a helical spring 34 one end of which bears against the loop 30 and the other end of which bears against said shoulder 32. Thus, as seen in Fig. 3, the spring 34 is compressed during operation of the driver 24 and when pressure is released from the driver 24 by the fingers of hand 35, the spring 34 expands raising the driver and consequently releasing blade 31 from screw 17. The guide 26 may be made of any suitable material and welded or otherwise secured to the tweezers. It will be observed that by the arms of guide 26, the screw driver 24 is held in spaced relation from the tweezers and by angularly disposing the legs 13, 14 of the tweezers the prongs or clamp portions 15, 16 are positioned under the screw driver. The guide 26 and member 11 may constitute a single stamping; and the entire tweezers or pincers may be formed out of a single piece of wire.

Fig. 1 illustrates the act of picking up the screw 17; Fig. 2 illustrates the manipulating of the tweezers to locate or position, the said screw; and Fig. 3 the driving of the screw within the hole 23 of plate 22. In starting the screw in its threaded action it is clamped between the grippers and pressure on the members 11, 12 slightly released permitting free movement of the screw. As the screw descends into the plate 22 and is near the end of its travel the head 25 of the screw will tend to wedge at the inclined portions 18, 19 of the grippers and by being forced downwardly by the screw driver will spread the members 11, 12 and slide through the grippers 15, 16 in tight engagement with the face of the plate or block 22. If it is desired to engage the screw with a nut (not shown) the grippers may be utilized to hold down the nut while the screw is being turned into the nut by the screw driver. This may be advantageous in doing electrical work.

Fig. 4 shows a modified form of screw driver used in connection with the tweezer device. In this case the blade 50 has a head 51 having a socket 52 within which is received the end of a tapered tool 53 which might be the shank of another screw driver. Interposed between the head 51 and the loop 30 is a helical spring 54, similar to that shown in Figs. 1 to 3.

While the device is particularly adapted to handle screws, it may be modified to handle other small objects in an equally facile manner. For instance, as shown in Fig. 6 the tweezer ends 60 and 61 may be designed to handle terminal fittings such as exemplified by the conductor 62, the eye 63, and the connecting globule of solder 64. For such work, the mentioned ends would preferably be provided with opposed arcuate surfaces 65 to engage the solder globule so that the eye of the terminal is positioned directly beneath and in register with the opposed lateral arcuate and tapered surfaces 66, the latter being similar to the described surfaces 18 and 19.

A device made in accordance with the invention is particularly adapted for use in connection with machine or blunt end screws and can be utilized to drive very small or even minute screws into the desired plate or base, the only requirement being that the blade of the screw driver should be of such dimensions that it might readily enter the slot or kerf of the screw.

It will thus be seen that there has been provided by this invention a tool in which the various objects hereinabove set forth, together with many thoroughly practical advantages, are successfully achieved.

As many possible embodiments may be made of the above invention, and as many changes might be made in the embodiments above set forth, it is to be understood that all matter hereinbefore set forth or shown in the accompanying drawing is to be interpreted as illustrative and not in a limiting sense.

I claim:

An implement comprising tweezers, and means fixed to and laterally extending from said tweezers for guiding a tool in the direction of the work holding end of said tweezers for actuating the work held by said end, said tweezers being provided with cooperable lateral arcuate tapered surfaces at said work holding end, forming a guide for the said work and spreadable by actuation of said tool upon said work, the ends of said legs being arced inwardly to facilitate engagement of said work and positioning said work between said tapered surfaces.

CHARLES HAUSBECK.